US011466739B2

(12) United States Patent
Zenzen et al.

(10) Patent No.: US 11,466,739 B2
(45) Date of Patent: Oct. 11, 2022

(54) BRAKE CALLIPER ARRANGEMENT HAVING LINING RESTORING FUNCTION (71) Applicant: ZF Active Safety GmbH, Koblenz (DE)

(72) Inventors: Guido Zenzen, Macken (DE); Marco Becker, Oberdürenbach (DE); Frank Wilhelm Madzgalla, Koblenz (DE); Christian Schroeter, Sinzig (DE); Jörg Knieper, Vallendar (DE); Florian Roessinger, Neuwied (DE); Peter Mäurer, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 88 days.

(21) Appl. No.: 16/636,104

(22) PCT Filed: Jul. 23, 2018

(86) PCT No.: PCT/EP2018/069907
§ 371 (c)(1),
(2) Date: Feb. 3, 2020

(87) PCT Pub. No.: WO2019/025219
PCT Pub. Date: Feb. 7, 2019

(65) Prior Publication Data
US 2020/0182316 A1 Jun. 11, 2020

(30) Foreign Application Priority Data
Aug. 1, 2017 (DE) ...................... 10 2017 007 288.4

(51) Int. Cl.
*F16D 65/097* (2006.01)
*F16D 55/22* (2006.01)
(Continued)

(52) U.S. Cl.
CPC ........ *F16D 65/0975* (2013.01); *F16D 55/228* (2013.01); *F16D 65/183* (2013.01);
(Continued)

(58) Field of Classification Search
CPC ............. F16D 65/0975; F16D 2127/02; F16D 2055/0029; F16D 55/228; F16D 65/183;
(Continued)

(56) References Cited

U.S. PATENT DOCUMENTS 4,491,204 A * 1/1985 Dirauf ................... F16D 65/097
116/208
6,598,715 B2 * 7/2003 Hikari ................... F16D 55/228
188/24.22
(Continued)

FOREIGN PATENT DOCUMENTS

CN 206377179 U * 8/2017 ............. F16D 55/22
DE 3023333 A1 * 1/1982 ......... F16D 65/0977
(Continued)

*Primary Examiner* — Thomas J Williams
(74) *Attorney, Agent, or Firm* — Robert James Harwood (57) ABSTRACT A brake caliper arrangement includes a housing, a restoring device, a first brake lining arrangement and a second brake lining arrangement. The first brake lining arrangement and the second brake lining arrangement can be moved relative to one another from a respective starting position with a reduction of an initial spacing which exists between them. The restoring device includes first and second restoring elements. The first restoring element may prestress the first brake lining arrangement into its starting position, while the second restoring element may prestress the second brake lining arrangement into its starting position. The first and/or second restoring elements may be supported, on both sides of a central region of the brake lining arrangement, on the associated brake lining arrangement. The first and/or second
(Continued)

restoring elements may be twisted elastically at least in sections in order to generate the prestress.

21 Claims, 6 Drawing Sheets

(51) Int. Cl.
 *F16D 55/228* (2006.01)
 *F16D 65/18* (2006.01)
 *F16D 55/00* (2006.01)
 *F16D 127/02* (2012.01)

(52) U.S. Cl.
 CPC .. *F16D 2055/0016* (2013.01); *F16D 2127/02* (2013.01); *F16D 2200/0021* (2013.01)

(58) Field of Classification Search
 CPC ......... F16D 2055/0016; F16D 65/0976; F16D 65/0978; F16D 55/22
 USPC ...................................................... 188/73.38
 See application file for complete search history.

(56) References Cited

U.S. PATENT DOCUMENTS

| | | | | |
|---|---|---|---|---|
| 6,920,965 | B2 * | 7/2005 | Burgdorf | ............ F16D 65/0975 |
| | | | | 188/73.38 |
| 10,801,565 | B2 * | 10/2020 | Krause | ................. F16D 65/095 |
| 10,962,068 | B2 * | 3/2021 | Brandl | ................ F16D 65/0975 |
| 2008/0296104 | A1 * | 12/2008 | Wen | ....................... F16D 55/228 |
| | | | | 188/73.38 |
| 2015/0129373 | A1 * | 5/2015 | Hirotomi | ................. B62L 3/00 |
| | | | | 188/73.31 |

FOREIGN PATENT DOCUMENTS

| | | | | |
|---|---|---|---|---|
| DE | 4304616 A1 * | 8/1994 | ....... F16D 55/22655 |
| DE | 60115197 T2 | 8/2006 | |
| DE | 102016104970 A1 | 12/2016 | |
| JP | S57179435 A | 11/1982 | |
| JP | H0738771 U | 7/1995 | |
| KR | 20110062165 A * | 6/2011 | |
| WO | 2011018815 A1 | 2/2011 | |
| WO | WO-2016202791 A1 * | 12/2016 | ............. F16D 55/00 |
| WO | WO-2019068619 A1 * | 4/2019 | ........... F16D 65/092 |

* cited by examiner

BRAKE CALLIPER ARRANGEMENT HAVING LINING RESTORING FUNCTION

CROSS-REFERENCE TO RELATED APPLICATIONS

This application is a national stage of International Application No. PCT/EP2018/069907, filed Jul. 23, 2018, the disclosure of which is incorporated herein by reference in its entirety, and which claimed priority to German Patent Application No. 102017007288.4, filed Aug. 1, 2017, the disclosure of which is incorporated herein by reference in its entirety.

TECHNICAL FIELD

The present invention relates to a brake caliper arrangement for a motor vehicle brake, which brake caliper arrangement provides a restoring function for a brake lining arrangement, and, furthermore, to a disk brake having a brake caliper arrangement of this type.

BACKGROUND

As is known, brake caliper arrangements serve to position brake lining arrangements relative to a brake disk and to make it possible to bring the brake lining arrangements into contact with the brake disk, in order to achieve a braking action. It is known in the prior art that, in the case of a decrease in a brake application force which acts on them, the brake lining arrangements can still be in contact with the brake disk, which results in what are known as residual wear torques which increase the energy consumption of a vehicle in an undesired manner. In order to avoid residual wear torques of this type, it is known, furthermore, to provide restoring devices which lift the brake lining arrangements from the brake disk reliably after a decrease in the brake application force and press them in the direction of their non-actuated starting position. More precisely, the restoring devices serve to set what is known as an air play between the brake lining arrangements and the brake disk.

It has been shown, however, that a sufficiently reliable setting of the air play is not always ensured by way of the restoring devices known up to now.

The invention is therefore based on the object of providing a brake caliper arrangement, by way of which a reliable setting of the air play is made possible.

SUMMARY

The brake caliper arrangement according to the invention which is provided for use in a motor vehicle disk brake and, in particular, in a fixed caliper disk brake comprises a first brake lining arrangement and a second brake lining arrangement which can be moved relative to one another from a respective starting position with a reduction of an initial spacing which exists between them. In other words, the brake lining arrangements can be moved along a movement axis and, in order to generate a braking action, can be moved relative to one another in such a way that and, in particular, such that they approach one another. Subsequently, they can be moved away from one another again in a reversed manner, in order to return into their respective starting positions and to re-establish the initial spacing.

The brake lining arrangements can in each case comprise a carrier plate and a friction lining which is arranged on the latter, the friction linings of the brake lining arrangements preferably facing one another.

In order to produce the movement, at least one of the brake lining arrangements can be moved by way of a suitable actuating unit, for example by means of a hydraulic and/or electromechanical actuating unit of the brake caliper arrangement. The brake caliper arrangement can also comprise a corresponding actuating unit per brake lining arrangement, in order to move both brake lining arrangements in an active manner. Generally, the brake caliper arrangement can be configured, in particular, as a fixed caliper arrangement.

Furthermore, the brake caliper arrangement comprises a housing, in which the first brake lining arrangement and the second brake lining arrangement are received at least partially. In a known way, the brake lining arrangements can define a receiving space for a brake disk which can likewise be received at least partially in the housing. The housing can be produced by way of metal casting. Furthermore, the housing can be of frame-like construction and/or can have a substantially rectangular, oval or polygonal outline which encloses a receiving space for the brake lining arrangements at least in sections. Said receiving space can be spanned at least partially by way of a crossmember or, in other words, a bridge. The crossmember or the bridge can extend here between opposite edge regions of the receiving space.

According to the invention, furthermore, the brake caliper arrangement comprises a restoring device having a first restoring element, in order to prestress the first brake lining arrangement into its starting position, and a second restoring element, in order to prestress the second brake lining arrangement into its starting position. Within the context of the present disclosure, prestressing into a predefined position is understood to also mean the active providing of prestressing forces when the predefined position is assumed. In other words, the prestressed element can as it were be held actively in the predefined position. One variant is likewise included, however, in the case of which, after the predefined position is reached, active forces are no longer introduced, but rather only when the predefined position is left. On account of the prestressing of the brake lining arrangements into their starting positions, the restoring device can act in the manner of a spreading spring which is set up to press the brake lining arrangements away from one another.

In order to generate the prestressing forces, the restoring elements can be capable of being deformed elastically. In accordance with one variant, the restoring elements are produced from a metallic material, for example from a spring steel. Generally, the restoring elements can make the setting of an air play possible, which setting was described in the introduction, and can be set up, for example, to press the brake lining arrangements back into their starting positions by a predefined amount, starting from a brake-active position, and in the process to lift them from a brake disk.

Furthermore, the invention provides that the first restoring element and/or the second restoring element are/is supported, on both sides of a central region of the brake lining arrangement which is assigned to them in each case, on the associated brake lining arrangement. The supporting can take place directly, for example by way of direct bearing of a restoring element against the respective brake lining arrangement. The position of a contact point or bearing region between the restoring element and the brake lining arrangement can determine the region of the introduction of a restoring force into the brake lining arrangement.

In accordance with one variant, the supporting takes place in such a way that the restoring forces are introduced into the brake lining arrangement substantially in line or only at a small spacing from the movement forces. As has been described, the movement forces can be provided via an actuating unit. The restoring forces and/or movement forces can be introduced into the brake lining arrangements substantially halfway up and/or at the level of the axis of the actuating unit. The introduction at the height of what is known as the effective friction radius is likewise conceivable. Lever arms which might otherwise lead to undesired tilting of the brake lining arrangement can be reduced by way of a correspondingly positioned introduction of the restoring forces and/or the movement forces.

The central region of the brake lining arrangement can be understood to mean a central region (as viewed in the circumferential direction of a brake disk) of the brake lining arrangements. It is to be noted in general that a person skilled in the art knows the position of the brake disk even in the case of an observation of a non-mounted brake caliper arrangement, since the brake lining arrangements and, in particular, their displacement movements are correspondingly oriented in relation to said brake disk. Accordingly, a person skilled in the art can unequivocally determine a radial direction and circumferential direction defined in relation to the brake disk, even in the case of an observation of the non-mounted brake caliper arrangement. This is also the case because a rotational axis of the brake disk is usually oriented at least substantially parallel to the movement axis of the brake lining arrangements.

In addition or as an alternative, the central region of the brake lining arrangements can comprise a corresponding central region along the longitudinal axis of the brake lining arrangements. The brake lining arrangements typically have a substantially rectangular, oval or polygonal outline which has a comparatively long longitudinal axis and a comparatively shorter vertical axis. Here, the vertical axis can run in the radial direction. Generally, the brake lining arrangements can have two edge regions which run substantially in the radial direction. Accordingly, the central region can be positioned centrally between said radial edge regions.

A further embodiment of the invention provides that the first restoring element is arranged in a contact-free manner with respect to the second brake lining arrangement at least in the starting position, and/or that the second restoring element is arranged in a contact-free manner with respect to the first brake lining arrangement at least in the starting position. In other words, the restoring elements can be assigned exclusively to their corresponding brake lining arrangement and do not interact in a significant way with the respective other brake lining arrangement, in particular do not bear against it or act on it. At least, a prestressing action of a restoring element on the brake lining arrangement which is assigned to it can exceed any indirect prestressing action of the other restoring element on precisely said brake lining arrangement and can preferably exceed it significantly. It is not ruled out, however, that the restoring elements per se make contact with one another or are supported at least indirectly on one another.

Generally, the first and second restoring elements can be configured separately from one another, for example as components which can be handled separately. Furthermore, the restoring elements can be of substantially U-shaped or C-shaped configuration, that is to say can have two limbs which extend substantially in parallel and are connected to one another via a connecting region. The limbs can extend radially inward starting from the connecting region.

One variant provides that the first and/or the second restoring element are/is a bent wire part. The wire can be produced from a spring steel and can have, for example, a substantially circular cross section. A diameter of the wire can lie between 0.5 mm and 15 mm, in particular between 2 mm and 5 mm.

It is provided according to the invention that the first and/or the second restoring element can be twisted elastically at least in sections in order to generate the prestress. In particular, the restoring elements can have an elastically twisted section in the state in which they are installed and ready for use. The twisting of the section can take place, for example, within the context of an insertion of the restoring element into the brake caliper arrangement and/or within the context of the clamping and/or latching (explained in the following text) of the restoring element during the mounting. One variant provides that said elastic deformation is maintained at least partially independently of the starting position or the brake-active position of the brake lining arrangements being assumed, in order to constantly maintain a minimum amount of prestressing forces.

In accordance with one embodiment, the first and/or the second restoring element have/has a clamping section which is dimensioned for clamping in a clamping arrangement of the brake caliper arrangement. The clamping section can comprise a locally projecting region of a restoring element, for example a U-shaped bulge. The elastic twisting of the restoring element in sections which has been described in the preceding text can be produced by way of the clamping of the clamping section.

The clamping arrangement can serve generally as a counterbearing, on which the clamping section can be supported as a consequence of the clamping. In addition or as an alternative, the clamping arrangement can comprise an undercut or a latching structure. In accordance with one variant, the clamping arrangement is positioned in such a way that it spans a receiving space for the brake lining arrangements at least in sections. In other words, as viewed along a movement axis, the clamping arrangement can be positioned at least partially between the brake lining arrangements, for example radially above the brake lining arrangements.

In accordance with one variant, the clamping arrangement is configured at least partially in the housing or is attached to the latter. This can comprise the formation of an undercut, a latching structure or a groove directly in the housing. In this context, the clamping arrangement can be configured in an above-described crossmember or a bridge of the housing, and can face, for example, the receiving space for the brake lining arrangements. One variant provides the configuration of a groove on a bottom side of a housing bridge, which bottom side faces the brake lining arrangements, the groove preferably making sliding of the clamping section possible in the case of a brake actuation.

It is likewise possible that the clamping arrangement is surrounded by a connecting arrangement which provides, in particular, a hold-down function and/or a tangential prestressing function for at least one of the brake lining arrangements. In other words, the connecting arrangement can comprise a hold-down spring, tangential spring or a component which is called a central spring in the following text and provides the two corresponding functions. A spring element of this type can in turn span the receiving space for the brake lining arrangements and/or can extend between and preferably radially above the brake lining arrangements. In a known way, the hold-down function can be provided by way of the generation of a hold-down force which acts on the brake lining arrangements in a radially inward manner. For this purpose, the corresponding spring element can be supported on the brake lining arrangements and/or can bear against them, for example against a radially upper circumferential edge of the brake lining arrangements. The tangential prestress can relate to a prestress in the circumferential direction or, in other words, in a rotational direction of the brake disk.

The connecting arrangement can in turn comprise or configure a suitable undercut or other latching structure, in order for it to be possible for the restoring elements to be clamped. In accordance with one variant, the connecting arrangement is of multiple-piece configuration and comprises a separate connecting element, by means of which both of the restoring elements can preferably be clamped. This can be, for example, a connecting bracket or a component which is shaped suitably in some other way. As an alternative, it is conceivable that the clamping arrangement is arranged on a main element of the connecting arrangement, for example on a possible spring element of the latter. For example, the clamping arrangement can be configured as a region which is contoured or shaped suitably within a central spring or hold-down spring. The clamping arrangement can likewise be attached or welded to a spring element of this type.

Furthermore, the connecting arrangement and, in particular, a possible central spring or hold-down spring of the latter, can comprise positioning sections, in which a corresponding restoring element can be received at least in sections. These can be slots, recesses or the like. The positioning sections can also serve as counterbearings, in order to facilitate the clamping or latching of the clamping section. For example, the clamping section can be twisted within the context of the clamping relative to a section of the restoring element, which section is held in the positioning section. At least two positioning sections of this type are preferably provided per restoring element, which positioning sections can be positioned, for example, on both sides of the clamping arrangement.

In this context, furthermore, it can be provided that the connecting arrangement comprises a sheet metal bent part which forms, for example, a central spring or hold-down spring. In comparison with the restoring elements, this could therefore be a substantially flat component, in which predefined contours are formed. Generally, the connecting arrangement and the restoring elements can be provided as separate components which are clamped and/or latched to one another within the context of the mounting of the brake caliper arrangement.

A further variant provides that the first and/or the second restoring element have, on both sides of the clamping section, in each case at least one supporting section, by way of which it is supported on the associated brake lining arrangement. The supporting sections can be formed by way of substantially parallel limbs of a restoring element. The arrangement on both sides can relate to an observation along the above-described longitudinal axis of a brake lining arrangement or an observation in the circumferential direction of a brake disk.

A further variant provides that the brake lining arrangements have recesses which are set up to at least partially receive the supporting sections of the restoring elements which are assigned to them in each case. The receiving can comprise an enclosure of a cross section of the supporting sections in sections and/or at least partially. An enclosure which is complete at least in sections can likewise be provided, for example if the recesses comprise bores with a closed cross section. The recesses can be configured in a carrier plate of the brake lining arrangements.

In one embodiment, the clamping section and the supporting sections extend substantially in one plane or in planes which are substantially parallel to one another in a non-clamped state of each restoring element. The non-clamped state can be equivalent to a state of the restoring elements, in which they have not yet been mounted in the brake caliper arrangement. Within the context of the clamping, however, the clamping section and the supporting sections can be moved relative to one another, in particular can be bent apart from one another or can be rotated with respect to one another. Here, they can leave the common plane or can be arranged in non-parallel planes.

In one embodiment, in each case one connecting section is arranged between the clamping section and the supporting sections, and the clamping section and the supporting sections extend in different directions relative to the connecting section. In other words, starting from the connecting section, the clamping section and the supporting sections can extend in different directions and, in particular, in directions which are opposed with respect to one another. In accordance with one variant, the supporting sections extend radially inward starting from the connecting section, and the clamping section extends radially outward. One variant provides that a first limb and the clamping section are connected via a first connecting section, and a second limb and the clamping section are connected via a second connecting section. Finally, the connecting sections can be the above-described, elastically twisted sections of a restoring element.

In accordance with one development, the clamping section and the supporting sections are twisted relative to one another in a clamped state. In particular, the clamping section can be bent in the direction of an opposite brake lining arrangement and/or radially inward, whereas the supporting sections can extend in the direction of a brake lining arrangement which is assigned to them.

A further embodiment provides that the first and/or the second restoring element have at least one hold-down section, in order to prestress the respective associated brake lining arrangement substantially transversely with respect to their movement direction. The hold-down section can be a section which runs radially inward and can extend, for example, in an opposed manner with respect to the clamping section. The hold-down section can be configured in a possible connecting section of a restoring element. One variant provides that in each case at least one hold-down section is provided on both sides of the clamping section. Finally, the hold-down section can engage into a recess in an associated brake lining arrangement, which recess can be present, for example, on a (radial) top side of the brake lining arrangement. A radially inwardly acting hold-down force can be generated via the hold-down section at the latest within the context of the clamping.

BRIEF DESCRIPTION OF THE DRAWINGS

Preferred embodiments of the invention will be described in greater detail in the following text on the basis of the appended diagrammatic drawings, in which.

DETAILED DESCRIPTION

Figure 1:
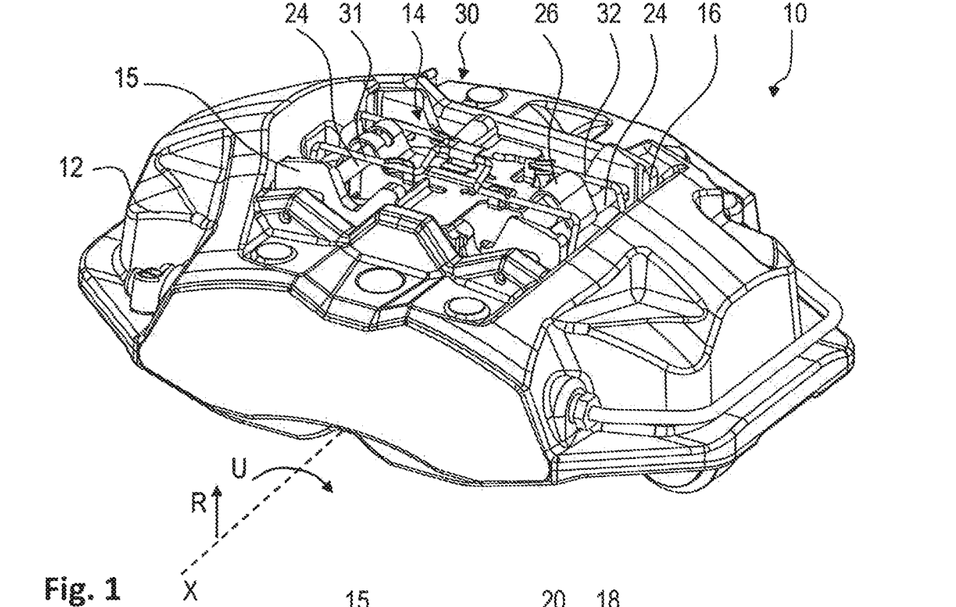
FIG. 1 shows a perspective view of a brake caliper arrangement in accordance with a first embodiment.

FIG. 1 shows a brake caliper arrangement 10 for a motor vehicle disk brake in accordance with a first exemplary embodiment. The brake caliper arrangement 10 comprises a housing 12 which is cast here and encloses a receiving space 14 in a frame-like manner. This additionally becomes clear from the bottom view of FIG. 2 and the plan view of FIG. 3. It can be seen, in particular, from FIG. 3 that the receiving space 14 has a substantially rectangular outline.

Figure 2:
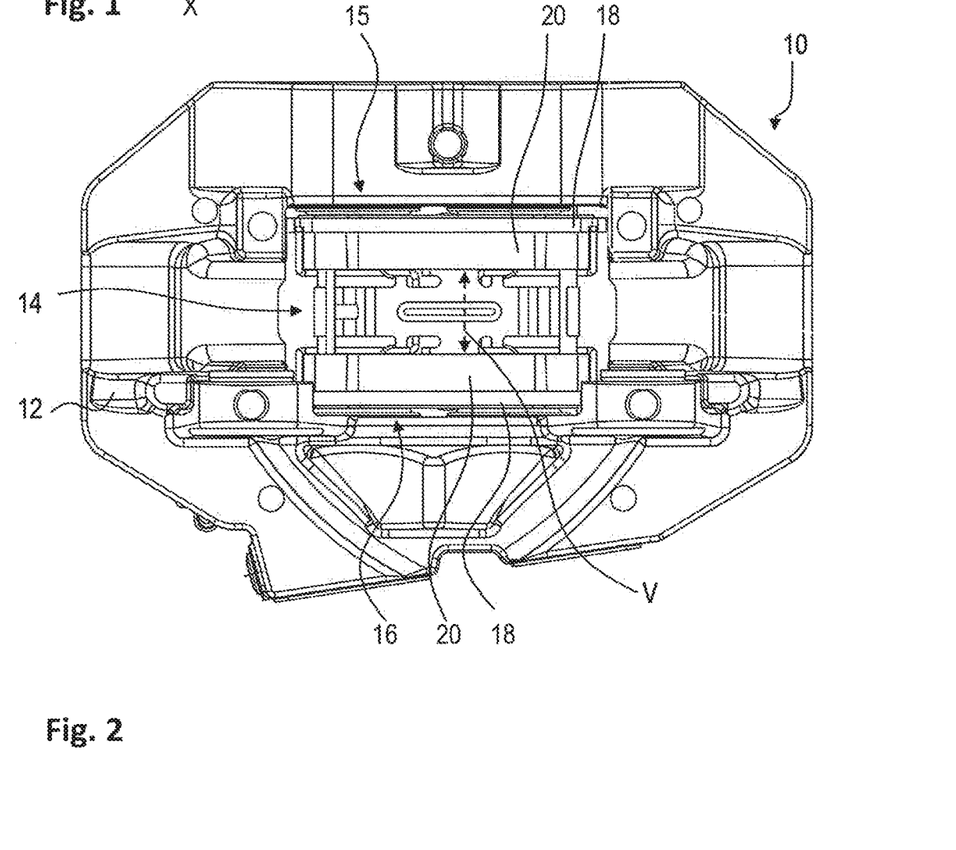
FIG. 2 shows a bottom view of the brake caliper arrangement from FIG. 1.
Figure 3:
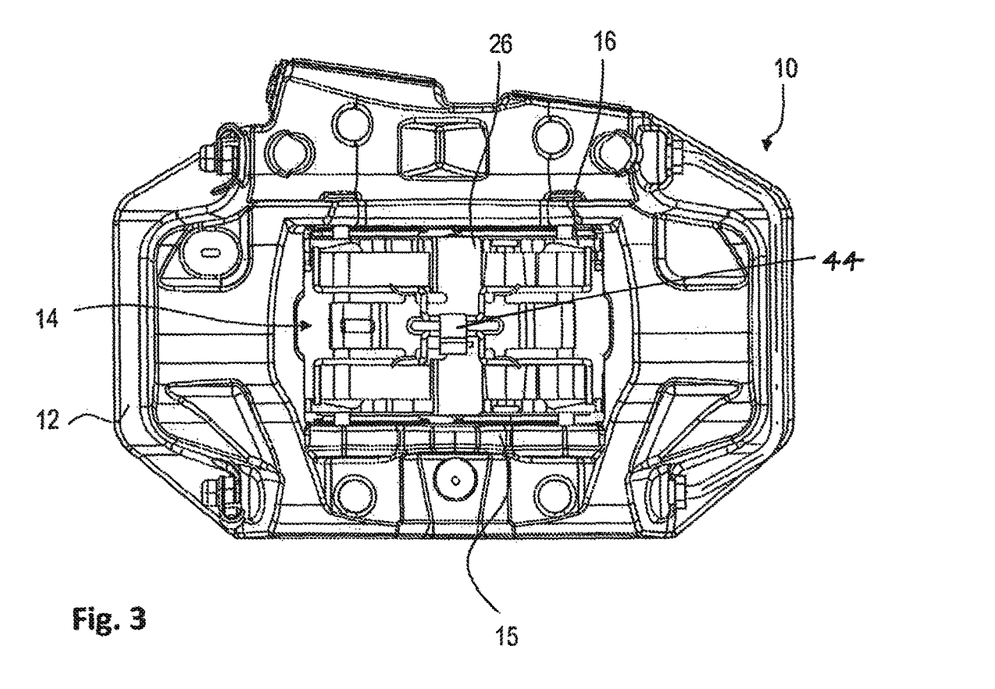
FIG. 3 shows a plan view of the brake caliper arrangement from FIG. 1, FIGS. 4*a-b* show individual part views of a restoring element of the brake caliper arrangement from FIG. 1.

A first brake lining arrangement 15 and a second brake lining arrangement 16 are arranged in the receiving space 14 (see FIGS. 2 and 3). Said brake lining arrangements 15 and 16 in each case comprise, in a known manner, a planar carrier plate 18 and a friction lining 20 which is arranged on the latter (see FIG. 2). Here, the friction linings 20 face one another.

FIGS. 1 to 3 show the brake lining arrangements 15, 16 in their brake-inactive starting position, in which they are at a defined air play from a brake disk (not shown). The brake disk can be received in a known way to a predefined extent between the brake lining arrangements 15, 16. In order to facilitate the orientation, FIG. 1 diagrammatically shows the position of a rotational axis X of the brake disk (not shown). Furthermore, a radially outwardly directed direction R is indicated diagrammatically, and a circumferential direction U is also shown, which directions are defined in relation to the brake disk. It goes without saying that a radially inwardly directed direction runs in an opposed manner with respect to the arrow R from FIG. 1. As mentioned in the introduction, a person skilled in the art can determine said directions unequivocally from a mere consideration of the non-mounted brake caliper arrangement 10, since the position of the brake disk results readily, in particular, from the orientation of the brake lining arrangements 15, 16.

Coming back to FIG. 2, a movement axis V is shown, along which the brake lining arrangements 15, 16 can be moved. In the case which is shown, the brake caliper arrangement 10 is configured as a fixed caliper arrangement, and each of the brake lining arrangements 15, 16 can be moved along the movement axis V by means of an actuating unit 22 which is assigned in a dedicated manner. The precise arrangement of the actuating units 22 which in each case act on the rear side on one of the brake lining arrangements 15, 16 is clarified by FIG. 6. Since the actuating units 22 are configured in accordance with known variants, a more precise description of them will be dispensed with.

In order to achieve a braking action, the brake lining arrangements 15, 16 can be moved toward one another along the movement axis V and with a reduction in their initial spacing which is shown in FIG. 2. As a result, they can be brought into contact with the brake disk (not shown), in order to achieve a vehicle retardation. If the braking action is to be decreased, a movement in the opposite direction takes place, by way of which the brake lining arrangements 15, 16 are moved away from one another. It is to be noted that the movement axis V extends parallel to the rotational axis X of the brake disk (not shown).

It can be seen in FIG. 1, furthermore, that the brake lining arrangements 15, 16 can be moved in each case in a manner which is guided via two guide rods 24, the guide rods 24 extending through corresponding receiving openings within the carrier plates 18. Furthermore, a central spring 26 is shown which will be described in greater detail in the following text and provides a hold-down function and a tangential prestressing function. This takes place via bearing sections 28 of the central spring 26 bearing (as results from FIG. 6) against a radial top side or outer side of the brake lining arrangements 15, 16. As a consequence of said contact, the tangential prestressing forces T which are indicated by way of corresponding arrows, extend at least on a proportional basis in the circumferential direction U of the brake disk, and generate the hold-down forces N which press the brake lining arrangements 15, 16 radially inward (see FIG. 6). Furthermore, it can be seen from FIG. 6 that the central spring 26 is configured as a substantially planar sheet metal bent part, in which individual contours and projections are formed.

Figures 5, 6:
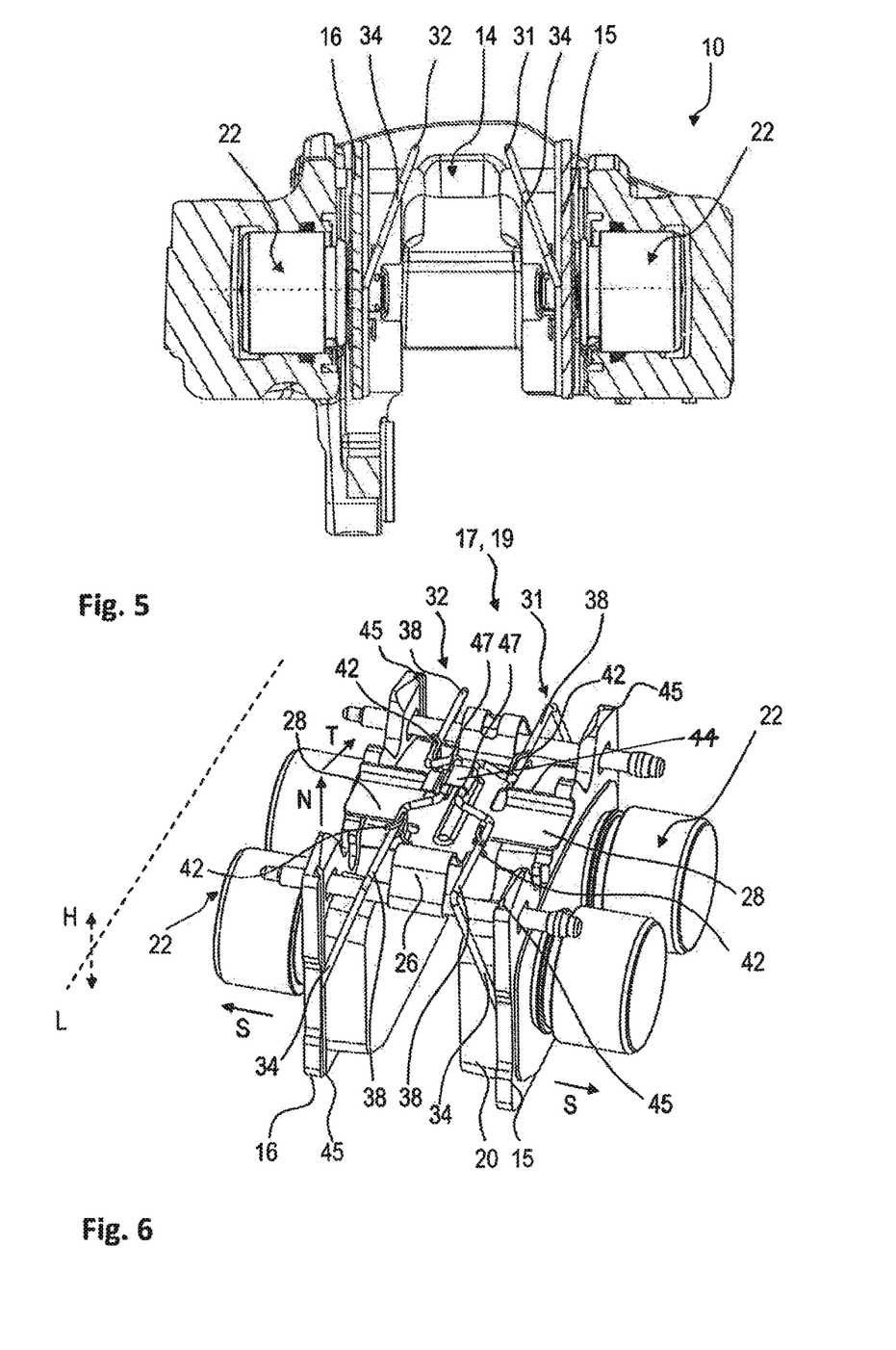
FIG. 5 shows a cross-sectional view (containing the movement axis) of the brake caliper arrangement from FIG. 1.
FIG. 6 shows a perspective view of the brake lining arrangements and restoring devices in accordance with the first embodiment.

Moreover, the arrangement of a restoring device 30 which comprises two restoring elements 31, 32 can already be seen from FIGS. 1 and 6. The restoring device 30 generates restoring forces which press the brake lining arrangements 15, 16 into their starting positions which are shown in FIG. 2. In other words, the restoring device 30 acts in the manner of a spreading spring which presses the brake lining arrangements 15, 16 apart from one another and the restoring forces of which run in an analogous manner with respect to the double arrow V in FIG. 2. Here, the restoring forces are dimensioned in such a way that they can be overcome easily by way of the actuating units 22, in order to achieve a movement of the brake lining arrangements 15, 16 which has a braking effect. If a corresponding brake application force or movement force is decreased or canceled, however, the restoring device 30 is set up to lift the brake lining arrangements 15, 16 reliably from the brake disk and to set a suitable air play of, for example, 0.8 mm.

In the following text, details of the restoring device 30 will be described in greater detail on the basis of FIGS. 1 to 6. FIG. 6 shows the brake lining arrangements 15, 16, the restoring device 30 and further selected components of the brake caliper arrangement 10 in a perspective individual view. It can be seen that the restoring elements 31, 32 are assigned directly in each case to only one of the brake lining arrangements 15, 16. In other words, the left hand (in FIG. 6) restoring element 32 is set up to prestress the left hand (in FIG. 6) brake lining arrangement 16 into the starting position, whereas the right hand (in FIG. 6) restoring element 31 is set up to prestress the right hand (in FIG. 6) brake lining arrangement 15 into the starting position. The restoring forces or prestressing forces which are provided in each case by the restoring elements 31, 32 are indicated in FIG. 6 by way of a corresponding arrow S.

Figure 4A:
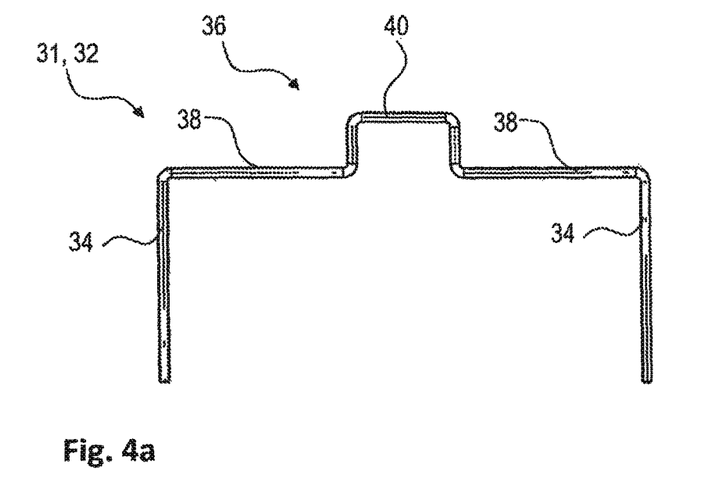
Figure 4B:
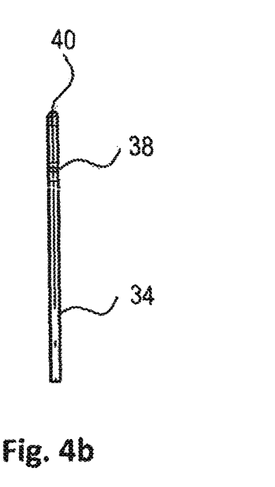

The restoring elements 31, 32 are configured in each case as a bent wire part and generally in an identical manner. FIGS. 4a-b show individual part illustrations of a restoring element 31, 32 in a non-installed state, that is to say in a state, in which it is not yet clamped. It can be seen that the restoring elements 31, 32 in each case comprise two limbs 34 which lie on the outside, extend parallel to one another, and form supporting sections of the restoring elements 31, 32 for the transmission of the desired restoring forces. The limbs 34 are connected to one another by way of a connecting region 36. More precisely, they merge in each case into a connecting section 38 which extends substantially at a right angle with respect to the limbs 34. A clamping section 40 is configured between the connecting sections 38, which clamping section 40 is bent out of the restoring element 32 in a projecting manner in the sense of a bulge. Relative to or (in other words) starting from the connecting sections 38, the limbs 34 and the clamping section 40 extend in opposite directions, the limbs 34 extending radially inward in relation to the mounted state, and the clamping section 40 extending radially outward. It becomes clear from FIG. 4a, furthermore, that the clamping section 40 is positioned centrally between the limbs 34. Generally, each restoring element 31, 32 therefore defines substantially a U-shape or C-shape on account of the parallel limbs 34.

The side view from FIG. 4b clarifies that each restoring element 31, 32 extends in one plane, and that the clamping section 40 and the limbs 34 (but also the connecting sections 38) are arranged in a common plane.

In order to generate the prestressing forces S, the restoring elements 31, 32 are deformed elastically in a predefined way during the insertion into the brake caliper arrangement 10. This becomes clear, in particular, from the view of FIG. 6. It can be seen there first of all that the restoring elements 31, 32 and, in particular, their connecting sections 38 are received in each case in slot-shaped positioning sections 42 of the central spring 26. Here, each of the connecting sections 38 is assigned a positioning section 42. In contrast, the open ends of the limbs 34 come to bear against the associated brake lining arrangement 15, 16. Subsequently, the clamping sections 40 in FIG. 6 are moved toward one another or are bent inward and, as a consequence, are twisted inward relative to the limbs 34 which already bear against the brake lining arrangements 15, 16. A connecting element 44 which engages around the clamping sections 40 is provided, in order to hold the clamping sections 40 in said position. More precisely, the clamping sections 40 can be brought into engagement in a clamping manner with undercuts 47 of the connecting element 44.

It is to be noted that the connecting sections 38 are supported here on the positioning sections 42 and are twisted in each case elastically, in particular on account of the limbs 34 which are fixed on the brake lining arrangements 15, 16. More precisely, when being clamped, the clamping sections 40 exert a torque on the connecting sections 38, as a result of which the latter are twisted elastically and force the limbs 34 into contact with the carrier plates 18 of the associated brake lining arrangements 15, 16. Overall, the restoring elements 31, 32 are therefore clamped in each case elastically, in order to provide the above-described restoring forces S.

It is to be noted that the connecting element 44 is provided separately from the central spring 26 in the exemplary embodiment which is shown. It is likewise conceivable, however, that the connecting element 44 is attached to or is integrally formed on the central spring 26. Furthermore, in order to permanently secure the clamping connection after engaging around the clamping sections 40, the connecting element 44 can be deformed plastically or can be locked permanently in some other way.

In summary, it is to be noted that, in the embodiment which is shown, the connecting element 44 and the central spring 26 form a connecting arrangement 19 which spans the receiving space 14 at least partially and makes clamping of the restoring elements 32 possible. More precisely, said connecting arrangement 19 provides a multiple-piece clamping arrangement 17 for generating the restoring action (see FIG. 6).

Moreover, it can be seen in FIG. 6 that the clamping sections 40 are clamped radially above and in a central region of the brake lining arrangements 15, 16. The central region of the brake lining arrangements 15, 16 is formed by way of a central (in the circumferential direction U) region of the brake lining arrangements 15, 16 (see FIG. 1). It likewise becomes clear from FIG. 6 that the brake lining arrangements 15, 16 have a comparatively pronounced longitudinal axis L and a vertical axis H which extends perpendicularly with respect to the former and radially and is comparatively short. The central region of the brake lining arrangements 15, 16 can therefore also be defined along their longitudinal axis L.

It becomes clear as a result that the limbs 34 of a respective restoring element 31, 32 are supported on both sides of the corresponding central regions of the associated brake lining arrangements 15, 16 and in the process span the friction lining 20. This permits a homogeneous and reliable introduction of restoring forces. Coming back to FIG. 6, it can be seen that the limbs 34 are also received here at least in sections in the recesses in the form of radially extending grooves 45 in the carrier plates 18 of the brake lining arrangements 15, 16.

Finally, it is to be noted that the limbs 34 of a respective restoring element 31, 32 according to FIG. 5 are supported on a brake lining arrangement 15, 16 approximately halfway up the latter. Therefore, the restoring forces are introduced substantially in a line with the movement forces of the actuating units 22 and, furthermore, lie at the level of the center of gravity of the brake lining arrangements 15, 16. As a consequence, disruptive lever arms are reduced, which decreases the risk of tilting of the brake lining arrangements 15, 16.

FIGS. 7 to 10 show a second embodiment of a brake caliper arrangement 10 according to the invention. Said second embodiment differs from the first embodiment, in particular, by way of a different type of clamping of the restoring elements 31, 32. Identical or identically acting features in comparison with the first embodiment are denoted by way of identical designations in the following text.

Figure 7:
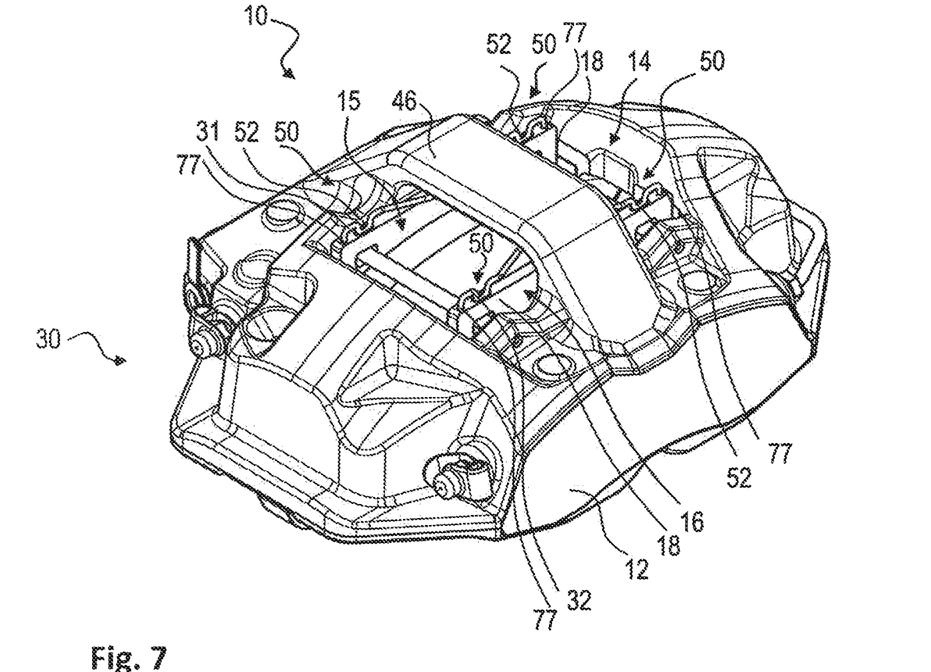
FIG. 7 shows a perspective view of a brake caliper arrangement in accordance with a second embodiment.

FIG. 7 shows the brake caliper arrangement 10 in accordance with the second embodiment in a perspective illustration. It can be seen that the housing 12 once again encloses a receiving space 14 in a frame-like manner for two brake lining arrangements 15, 16 which lie opposite one another. The method of operation and the movement of the brake lining arrangements 15, 16 take place in an analogous manner with respect to the first exemplary embodiment. The housing 12 differs from the previous example in that a crossmember or, in other words, a bridge 46 is provided which spans the receiving space 14. More precisely, the bridge 46 connects two side regions of the housing 12 which lie opposite one another, said side regions running parallel to the brake lining arrangements 15, 16 in the case which is shown. In the exemplary embodiment which is shown, the bridge 46 is configured as an integral constituent part of the cast housing 12. It is likewise conceivable, however, to provide the bridge 46 as a separate component and to fasten it to the housing 12.

Figure 8:
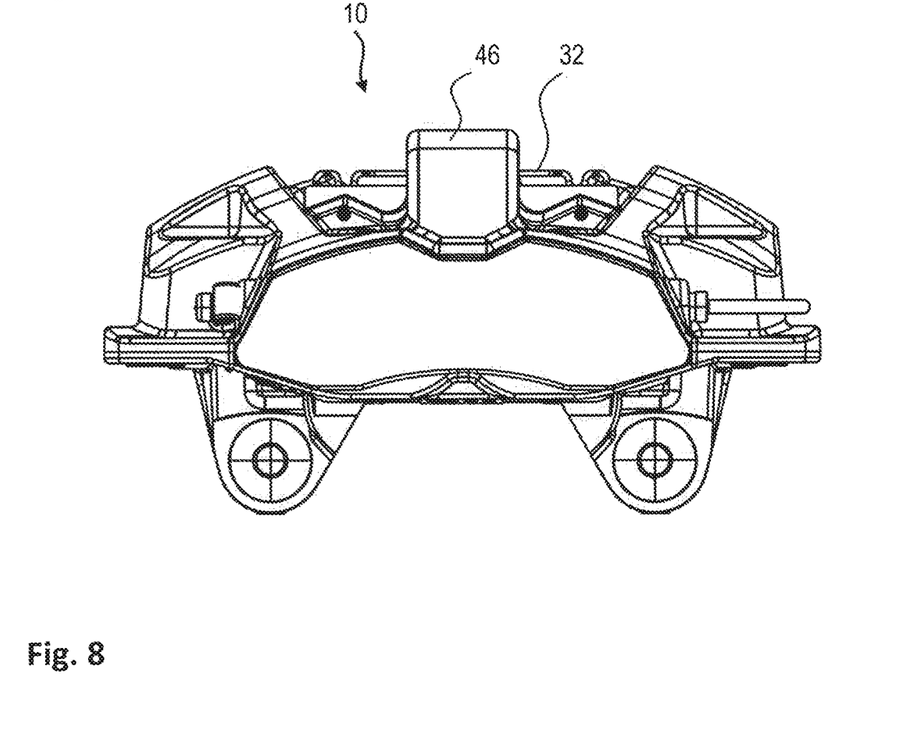
FIG. 8 shows a side view of the brake caliper arrangement from FIG. 7.
Figure 9:
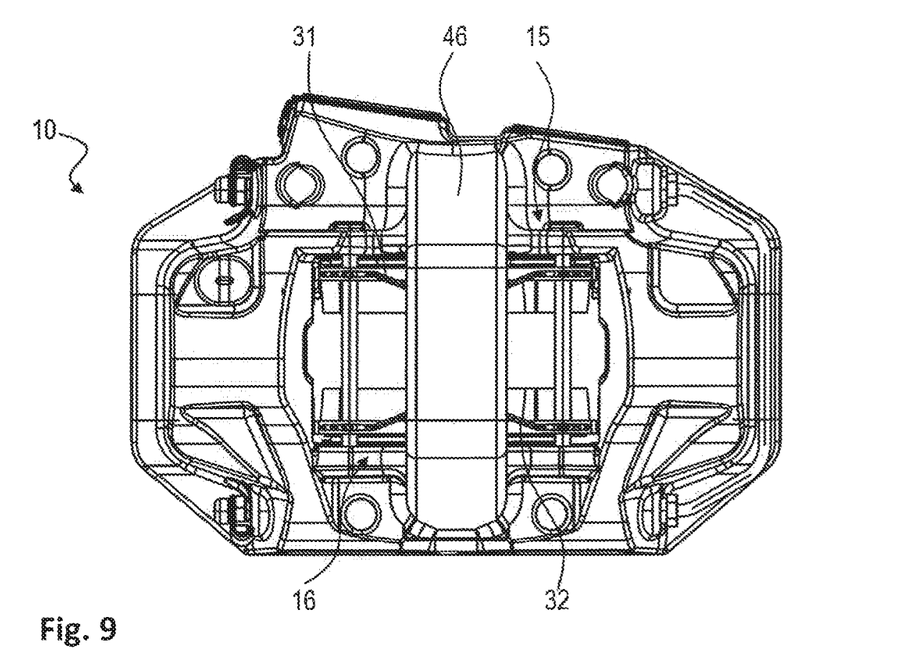
FIG. 9 shows a plan view of the brake caliper arrangement from FIG. 7, FIGS. 10a-d show individual part views of a restoring element of the brake caliper arrangement from FIG. 7.
Figure 10A:
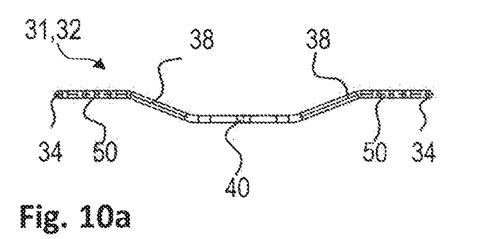
Figure 10B:
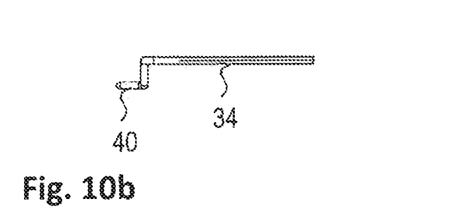
Figure 10C:
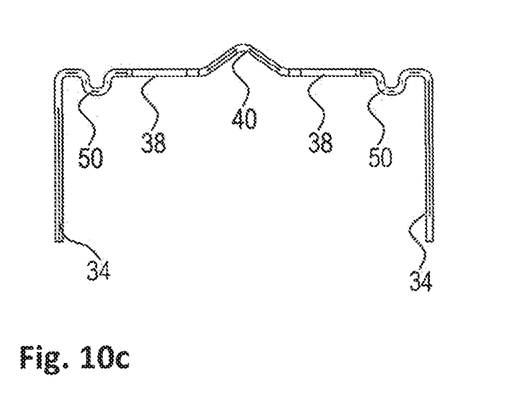
Figure 10D:
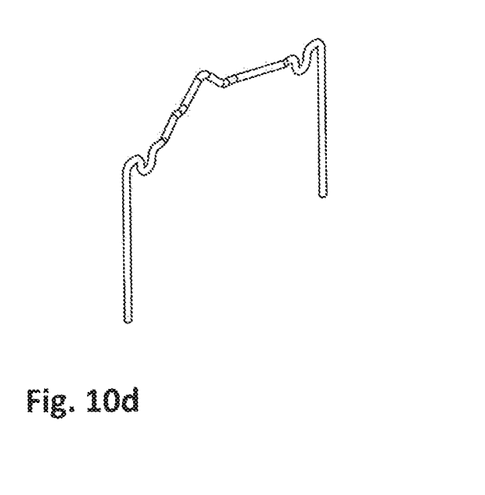

Furthermore, it can be seen again, in particular, in FIGS. 7 to 9 that each of the brake lining arrangements 15, 16 is once again assigned a restoring element 31, 32 in the form of a bent wire part, which restoring elements 31, 32 form the restoring device 30 of the brake caliper arrangement 10. In contrast to the first exemplary embodiment, however, there is no central spring 26 which acts on the brake caliper arrangements 15, 16 and in which the restoring elements 31, 32 are positioned at least in sections. Instead, the restoring elements 32 engage into a clamping arrangement 60 on a bottom side of the bridge 46, in order to exert restoring forces which act in an analogous manner on the brake lining arrangements 15, 16. As can be seen from FIG. 11, said clamping arrangement 60 is configured as a groove which extends along the movement axis of the brake lining arrangements 15, 16.

In order to describe the clamping in more precise detail, the structure of a respective restoring element 31, 32 will first of all be described on the basis of FIGS. 10a-d. FIGS. 10a-d represent in each case individual part views of a restoring element 31, 32, the two restoring elements 31, 32 of the brake caliper arrangement 10 once again being of identical configuration. It becomes clear again that the restoring elements 31, 32 have parallel limbs 34, from which connecting sections 38 which run in the direction of a clamping section 40 extend. The limbs 34 once again form supporting sections of the restoring elements 31, 32 for the transmission of the desired restoring forces.

With regard to the connecting section 38, the limbs 34 and the clamping section 40 once again extend in different directions. Furthermore, each connecting section 38 has a hold-down section 50 which, starting from the connecting section 38, extends in an identical direction to the limbs 34. More precisely, the hold-down sections 50 are configured as projection-like or U-shaped bulges. It can be seen from FIG. 10b that the limbs 34 and the clamping section 40 are not arranged in a common plane, but rather in planes which are parallel to one another.

As can be seen from FIG. 7, the limbs 34 of the restoring elements 31, 32 in the second embodiment are received virtually completely in recesses 77 in the carrier plates 18 of the brake lining arrangements 15, 16. Said recesses 77 are configured as radially extending bores, into which the limbs 34 can be pushed virtually completely. Furthermore, further recesses 52 for the hold-down sections 50 are provided on the radially outwardly pointing top side of the carrier plate 18. The hold-down sections 50 are received at least partially in said recesses 52.

For clamping purposes, the restoring elements 32 are first of all coupled to an associated brake lining arrangement 15, 16 by way of the limbs 34 and the hold-down sections 50 being pushed in. The corresponding units consisting of a restoring element 31, 32 and a brake lining arrangement 15, 16 are subsequently moved from below (in relation to FIG. 7) into the receiving space 14 and in the direction of the bridge 46. The clamping sections 40 thereupon come into contact with the bottom side of the bridge 46. This state is shown in the cross-sectional view of FIG. 11.

If the introduction movement of the brake lining arrangements 16 is continued (that is to say, if the brake lining arrangements 16 are moved further radially to the outside), the clamping sections 40 are tilted, since they are bent successively toward one another and radially inward. Here, they are also twisted relative to the limbs 34. This is continued until the brake lining arrangements 15, 16 have reached their final position. Here, an elastic torsional stress is once again generated in the connecting sections 38. Said stress is maintained by way of the clamping sections 40 being brought into engagement with the clamping arrangement 60 on the bottom side of the bridge 46, in order for it to be possible for the desired restoring forces to be provided permanently. At the same time, a radially inwardly acting hold-down force is exerted on the brake lining arrangements 15, 16 via the hold-down sections 50.

It is to be noted that the bores 77 for receiving the limbs 34 in the carrier plates 18 can have an enlarged diameter with respect to the limbs 34, with the result that the limbs 34 can be received therein with a play and even slightly obliquely. As in the case of the first exemplary embodiment, this makes it possible to introduce the restoring forces predominantly halfway up the brake lining arrangements 15, 16, in order to reduce the above-described lever arms.

In summary, therefore, there is also one dedicated restoring element 31, 32 per brake lining arrangement 15, 16 in this case. Each of said restoring elements 31, 32 once again has supporting sections in the form of the limbs 34 which are arranged on both sides of a central region of the associated brake lining arrangement 15, 16 (see, in particular, FIG. 7).

Figure 11:
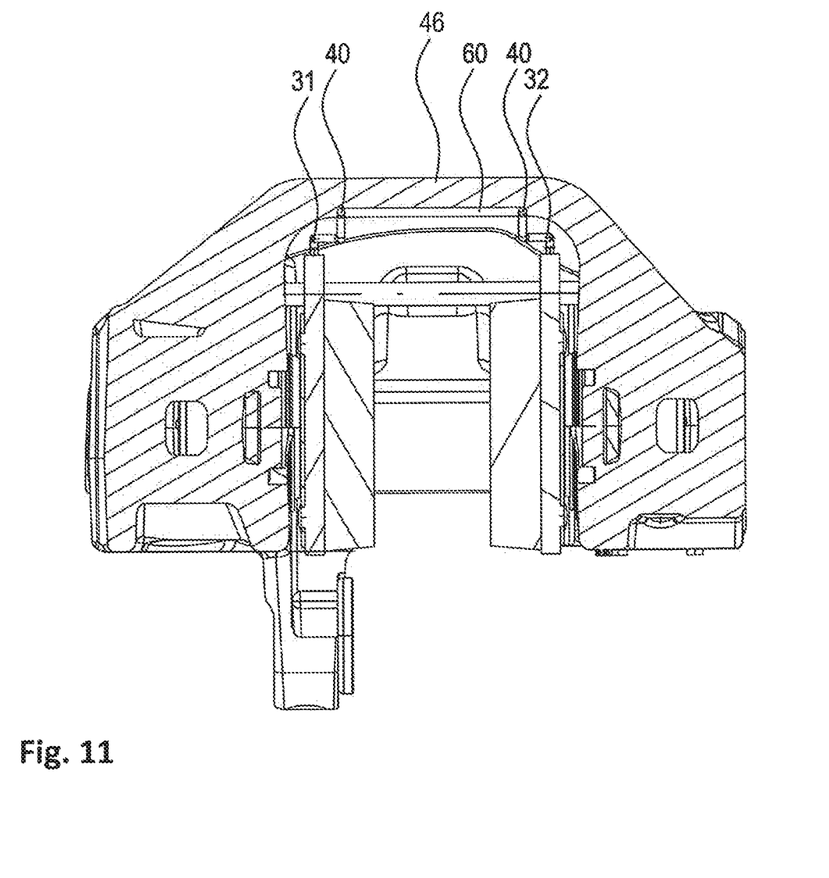
FIG. 11 shows a cross-sectional view (containing the movement axis) of the brake caliper arrangement from FIG. 7.

Finally, it is to be noted that the groove-shaped clamping arrangement 60 from FIG. 11 also makes sliding of the clamping sections 40 possible during a brake actuation and the movement of the brake lining arrangements 15, 16 which takes place in the process. The initially set relative twisting between the clamping sections 40 and the limb 34 of each restoring element 31, 32 is maintained by way of the common moving (made possible by way of this) of the clamping sections 40 and the limbs 34 which are coupled to the carrier plates 18, as a result of which the torsion-induced restoring forces also remain substantially constant. This applies even in the case of increasing lining wear and the associated increase in the movement travel.

The invention claimed is:

1. A brake caliper arrangement for a motor vehicle brake, having:
    a first brake lining arrangement and a second brake lining arrangement which can be moved relative to one another from a respective starting position with a reduction of an initial spacing which exists between them,
    a housing, in which the first brake lining arrangement and the second brake lining arrangement are received at least partially, and
    a restoring device which comprises a first restoring element, in order to prestress the first brake lining arrangement into its starting position, and a second restoring element, in order to prestress the second brake lining arrangement into its starting position,
    the first restoring element and the second restoring element being supported on both sides of a central region of the brake lining arrangement, wherein at least one of the first restoring element and the second restoring element is configured to be twisted elastically at least in sections against a torsional stiffness of the at least one first and second restoring elements in order to generate the prestress.

2. The brake caliper arrangement as claimed in claim 1, the first restoring element being arranged in a contact-free manner with respect to the second brake lining arrangement at least in the starting position, and/or the second restoring element being arranged in a contact-free manner with respect to the first brake lining arrangement at least in the starting position.

3. The brake caliper arrangement as claimed in claim 1, the first and/or the second restoring element being a bent wire part.

4. The brake caliper arrangement as claimed in claim 1, the first and/or the second restoring element having a clamping section which is dimensioned for clamping in a clamping arrangement of the brake caliper arrangement.

5. The brake caliper arrangement as claimed in claim 4, the clamping arrangement spanning a receiving space for the brake lining arrangements at least in sections.

6. The brake caliper arrangement as claimed in claim 4, the clamping arrangement being configured at least partially in the housing or being attached to the latter.

7. The brake caliper arrangement as claimed in claim 4, the clamping arrangement being surrounded by a connecting arrangement which provides a hold-down function and/or a tangential prestressing function for at least one of the brake lining arrangements.

8. The brake caliper arrangement as claimed in claim 7, the connecting arrangement comprising a sheet metal bent part.

9. The brake caliper arrangement as claimed in claim 1, the first and/or the second restoring element having, on both sides of the clamping section, in each case at least one supporting section, by way of which it is supported on the associated brake lining arrangement.

10. The brake caliper arrangement as claimed in claim 9, the brake lining arrangements including carrier plates into which recesses extend so as to at least partially receive the supporting sections of the restoring elements which are assigned to them in each case.

11. The brake caliper arrangement as claimed in claim 9, the clamping section and the supporting sections extending substantially in one plane or in planes which are substantially parallel to one another in a non-clamped state of each restoring element.

12. The brake caliper arrangement as claimed in claim 9, in each case one connecting section being arranged between the clamping section and the supporting sections, and the clamping section and the supporting sections extending in different directions relative to the connecting section.

13. The brake caliper arrangement as claimed in claim 9, the clamping section and the supporting sections being twisted relative to one another in a clamped state.

14. The brake caliper arrangement as claimed in claim 9, the first and/or the second restoring element having at least one hold-down section, in order to prestress the respective associated brake lining arrangement substantially transversely with respect to their movement direction.

15. The brake caliper arrangement as claimed in claim 1, wherein each restoring element includes limbs that are received in recesses extending into sides of the respective first and second brake lining arrangements facing one another.

16. The brake caliper arrangement as claimed in claim 15, wherein each restoring element includes hold-down sections positioned in second recesses extending into sides of the respective first and second brake lining arrangements facing the same direction.

17. The brake caliper arrangement as claimed in claim 16, wherein each restoring element includes a bent connecting section positioned equidistant from the limbs, the connecting section being twisted elastically in response to positioning the limbs in the recesses.

18. The brake caliper arrangement as claimed in claim 1, wherein the housing includes a bridge spanning a receiving space in which the first and second brake lining arrangements are provided, the first and second restoring elements abutting a side of the bridge facing the receiving space and being positioned entirely on one side of the bridge to bias the first and second brake lining arrangements away from one another.

19. The brake caliper arrangement as claimed in claim 1, wherein the first and second restoring elements are separate components such that first and second restoring elements independently prestress the first and second brake lining arrangements.

20. The brake caliper arrangement as claimed in claim 1, wherein each of the first restoring element and the second restoring element includes first and second connecting sections extending along centerlines and a limb extending transversely from each connecting section, wherein the first and second clamping sections are twisted about the respective centerlines to force the limbs against the brake lining arrangement to generate the prestress.

21. The brake caliper arrangement as claimed in claim 1, wherein the first and second restoring elements have circular longitudinal cross-sections.

* * * * *